Apr. 24, 1923.

J. M. H. JACOBS

AEROPLANE WING

Filed Sept. 20, 1918

Apr. 24, 1923.
J. M. H. JACOBS
1,452,641
AEROPLANE WING
Filed Sept. 20, 1918
2 Sheets-Sheet 2
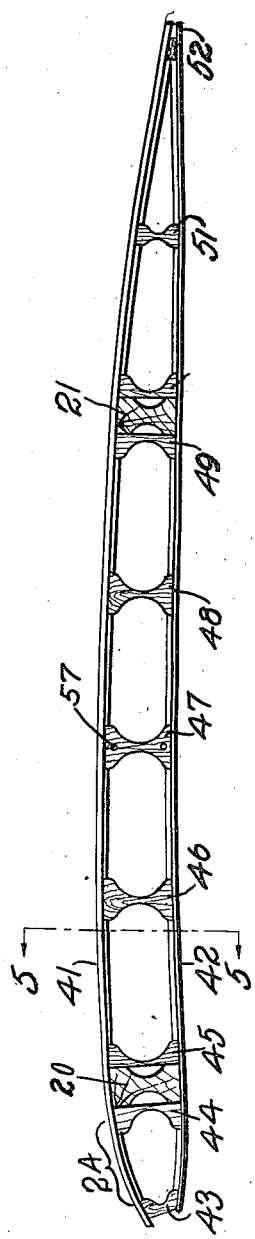

Patented Apr. 24, 1923.

1,452,641

UNITED STATES PATENT OFFICE.

JAMES M. H. JACOBS, OF DAYTON, OHIO, ASSIGNOR, BY MESNE ASSIGNMENTS, TO DAYTON-WRIGHT COMPANY, OF DAYTON, OHIO, A CORPORATION OF DELAWARE.

AEROPLANE WING.

Application filed September 20, 1918. Serial No. 254,952.

*To all whom it may concern:*

Be it known that I, JAMES M. H. JACOBS, a citizen of the United States of America, residing at Dayton, county of Montgomery, State of Ohio, have invented certain new and useful Improvements in Aeroplane Wings, of which the following is a full, clear, and exact description.

This invention relates to aeroplane wing construction and has for its principal object the provision of an improved aeroplane wing wherein the maximum of strength for a given weight is obtained.

A further object of the present invention resides in providing a wing which can be cheaply and easily manufactured.

Other and further objects and advantages of the present invention will be apparent from the following description, reference being had to the accompanying drawing wherein a preferred embodiment of the present invention is clearly shown.

In the drawings:

Fig. 4 is a side view of one of the beams shown in Fig. 1 but in connection with an ordinary spar;

Fig. 5 is a sectional view taken on line 5—5 of Fig. 4; and

Figs. 6 and 7 are side elevations of forms of the beam struts.

Figure 1:
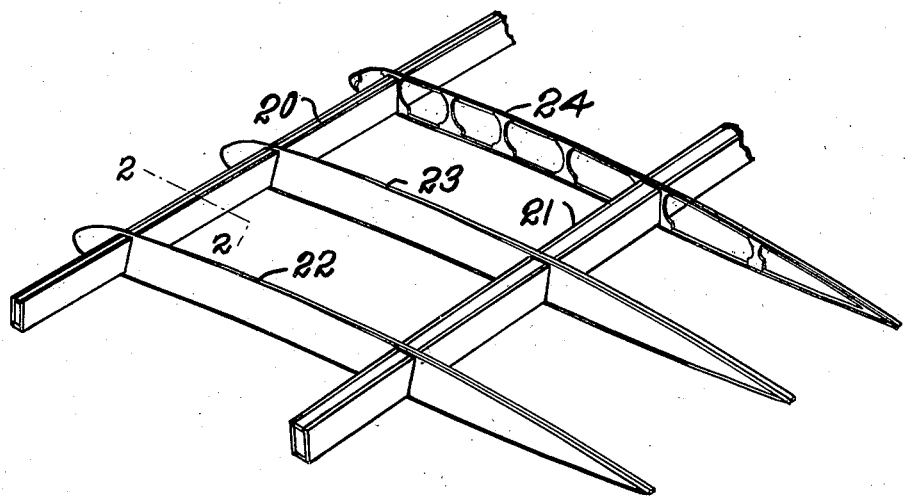
Fig. 1 is a fragmentary perspective view of the frame of an aeroplane wing embodying the present invention.

Referring to the drawings, 20 and 21 designate the wing spars which extend outwardly from the body of the aeroplane and carry a plurality of wing beams spaced at intervals. There are two of these spars to each wing, the number of wing beams used depending upon the size of the wing. Three of these beams, 22, 23 and 24, are shown in Fig. 1, the showing as to two of them being purely diagrammatic.

Figures 2, 3:
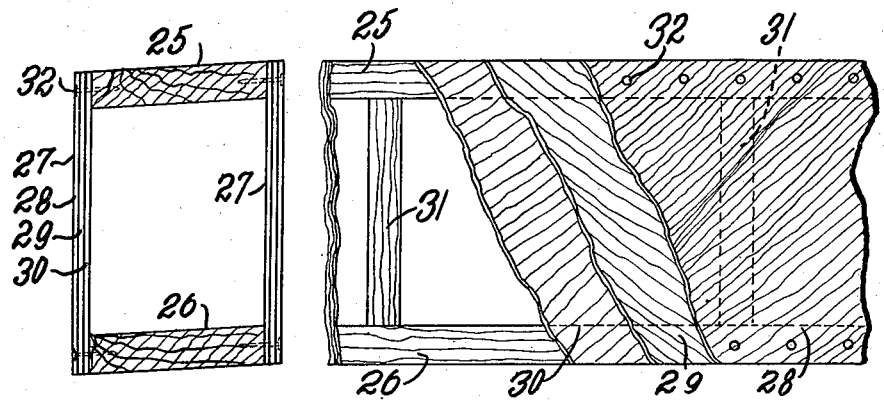
Fig. 2 is a cross-section of the spar taken on the line 2—2 of Fig. 1.
Fig. 3 is a fragmentary side view of the spar, part of the side section thereof being broken away to show the construction.

The spars 20 and 21 are structurally alike, the only differences between them arising from the necessity for making them of slightly different size and shape, because of their different location in the wing frame. Each spar consists of top and bottom sections 25 and 26 spaced apart by struts 31. Firmly connected to the top and bottom sections are side sections 27 each of which consists of a plurality of layers or veneers 28, 29 and 30, of wood, or analogous fibrous material. These layers or veneers are so arranged that the grain of each veneer runs diagonally with respect to the grain of any adjacent veneer, the grain of any veneer being, preferably, substantially perpendicular to the grain of an adjacent veneer. As shown in Fig. 3 the grain of the two outer layers runs in the same direction, while the grain of the center layer 29 runs transversely to the grain of these outer layers. The arrangement of the veneers is such that the grain of each of them runs diagonally with respect to the neutral axis of the top and bottom sections 25 and 26. By virtue of this construction the shear strains which are placed upon the spars will be carried by the side sections 27 in the most efficient manner, the grain of the plies of the side sections running in the same direction as the brace wires of an ordinary truss would run if wires were used instead of veneering, that is, from the foot of one strut 31 to the top of the adjacent strut 31. It has been found that by constructing the spar in the manner described, with the side sections arranged as shown, considerably greater strength may be obtained for the same weight of material. In other words, for a given strength, the weight of a spar thus constructed will be much less than with a solid spar of the same weight or one in which the grain of the veneers of the side sections is given some other relative arrangement, for instance with the grain arranged longitudinally of the top and bottom members.

In Fig. 4 is shown a detailed view of one of the wing beams shown in Fig. 1. Each of these beams comprises a top batten 41 and a bottom batten 42 connected together in any desired manner, and spaced apart by means of struts 43, 44, 45, 46, 47, 48, 49, 50, 51 and 52 which are of such length and shape that when assembled in position with the battens firmly attached thereto, as shown in Fig. 4, the beam will have the correct configuration. The battens are T shaped the top batten 41 being provided with a web 53, and the bottom batten with a web 54. The webs 53 and 54 engage with grooves 55 in the ends of the struts.

In Fig. 5 the strut 46 is shown provided with grooves 35. In assembling the wing beams the grooves in the ends of the struts are first coated with glue, the battens are then placed in position with the web portions 53 and 54 engaging the grooves in the struts, the members being finally secured together by means of nails 56 driven through the battens and into the struts. The nails 56 may be dispensed with if desired. They are used primarily for holding the parts in assembled position until the glue has had time to set properly. Any other means might be used for thus holding the parts during this time. The weight of the struts may be reduced without materially affecting the strength thereof by cutting holes therein, such as the holes 57 in the strut 46. A modified form of strut is shown in Fig. 7 and consists of a rectangular shaped block 60 provided with a large opening 61 to reduce the weight thereof without lowering the strength below the desired minimum.

The usual form of wing beam comprises a web portion made of multi-ply veneer, generally three-ply, extending the full length of the beam and cut to give the desired shape, and of top and bottom flange members formed of approximately flat strips of wood nailed to the edges of the web portion. The web portion is generally cut out at intervals to reduce the weight thereof. In making the web portion of a beam in this manner a large amount of material is wasted. Furthermore a beam of this type as ordinarily constructed is frail, since the center ply of the web portion is the only ply having its grain running transversely to the beam and, therefore, is the only member which is effective to carry the transverse bending stresses which are placed upon the beam.

A wing beam constructed in accordance with the present invention possesses several advantages over the conventional beam described above. This construction permits of the entire elimination of all the bracing wires, tie rods, etc. now used in wing beam construction. This is a very substantial advantage, especially during aerial military operations. Where a bracing wire or turnbuckle is used, a single direct hit from a rifle or machine gun bullet will completely sever it with a possible disintegration of an entire wing as a result. And even a glancing blow frequently causes such weakening of the metallic members that breaking of the wire or tie rod soon results. Where wing beams made entirely of wood, or analogous material, are used, however, they may be shot through repeatedly without any dangerous injury thereto.

The top and bottom battens, 41—42, are formed with the grain of the wood running longitudinally thereof and serve to take up the longitudinal bending stresses placed upon the beam, the integral flanges 53, tending to stiffen the battens and increase their resistance to such longitudinal stresses. Further, the strut members are so located that their grain runs in the proper direction to best withstand the transverse stresses placed upon the beam, preferably with the grain transverse to the length of the beam. As a result considerably greater strength for a definite weight of material is secured. And not only does this construction lend itself to the production of a more satisfactory wing beam, but it also permits of considerable reduction in the cost of manufacture. For example, the struts can be made with comparatively very little waste of material, scraps and small pieces that would ordinarily be thrown away in the manufacture of the present conventional wing beams, being frequently capable of utilization. In addition cooperating tongue and groove construction of the battens and struts not only facilitates assembly but also adds greater strength to the assembled beam. And these advantages of construction are also present in the spar described above.

It is obvious that these spars and wing beams may be made of any desired dimensions without in any way varying the fundamentals of construction set out above. And it is equally obvious that spars and wing beams so constructed may be readily assembled, in the usual manner, into complete wing frames having the necessary strength with a considerable saving in weight and cost of manufacture.

While the form of mechanism herein shown and described constitutes a preferred form of embodiment of the invention, it is to be understood that other forms might be adopted, all coming within the scope of the claims which follow.

What I claim is:—

1. In an aeroplane wing frame, a wing spar comprising top and bottom sections spaced apart by struts, side sections cooperating therewith, said side sections consisting of a plurality of veneers, the grain of the veneers running at an angle with the axis of the spar, whereby the veneer fibers act after the manner of brace wires in a simple truss.

2. In an aeroplane wing frame, a wing spar comprising top and bottom sections spaced apart by struts, side sections cooperating with the top and bottom sections, each side section consisting of a plurality of veneers, the grain of the veneer being arranged substantially in the direction of a line drawn from the foot of one strut to the top of an adjacent strut.

3. In an aeroplane wing frame, a wing spar comprising longitudinal sections spaced apart by struts, side sections attached thereto, each side section consisting of a plurality of veneers, the grain of the veneers being arranged substantially at an angle to both the struts and the longitudinal sections.

4. In an aeroplane wing frame, a wing spar comprising top and bottom sections spaced apart, and side sections co-operating therewith, said side sections consisting of a plurality of veneers, the grain of each veneer running transversely of the length of the spar, and at an angle to the longitudinal axis of the spar.

5. In an aeroplane wing frame, a wing spar comprising top and bottom sections spaced apart, side sections attached thereto, each side section consisting of a plurality of veneers, the grain of each veneer being arranged perpendicular to the grain of any adjacent veneer, and the grain of each veneer being arranged transversely of the length of the spar.

6. In an aerofoil, a spar comprising longitudinal members spaced apart by struts, side sections attached thereto, each side section consisting of a plurality of veneers, the grain of each ply being at an angle with the grain of the adjacent plies, the grain of each ply being also at an angle with both the vertical and longitudinal shearing stresses acting when the spar is under load.

In testimony whereof I affix my signature.

JAMES M. H. JACOBS.

Witnesses:
F. O. CLEMENTS,
THOMAS MIDGLEY, Jr.